United States Patent [19]

Hofmann et al.

[11] Patent Number: 4,898,699

[45] Date of Patent: Feb. 6, 1990

[54] METHOD FOR BONDING A POROUS METAL LAYER TO A CERMET SURFACE

[75] Inventors: Hans Hofmann, Muehlheim; Hartmut Wendt, Dieburg, both of Fed. Rep. of Germany

[73] Assignee: Messerschmitt-Boelkow-Blohm GmbH, Munich, Fed. Rep. of Germany

[21] Appl. No.: 214,509

[22] Filed: Jul. 1, 1988

[30] Foreign Application Priority Data

Jul. 1, 1987 [DE]  Fed. Rep. of Germany ....... 3721753

[51] Int. Cl.$^4$ ............... B29C 67/20; C04B 35/00; C04B 35/64; C04B 41/81
[52] U.S. Cl. ............................ 264/43; 264/61; 264/62; 264/DIG. 25; 264/DIG. 36; 427/376.3
[58] Field of Search ................... 264/42–44, 264/61–63, 65, 66, DIG. 36, DIG. 25; 427/376.2, 376.3, 376.6

[56] References Cited

U.S. PATENT DOCUMENTS

| | | | |
|---|---|---|---|
| 2,467,528 | 4/1949 | Hauser | 264/65 |
| 2,706,682 | 4/1955 | Barnard et al. | 264/DIG. 36 X |
| 2,747,260 | 5/1956 | Carlton et al. | 264/DIG. 36 X |
| 3,074,143 | 1/1963 | Smith | 264/62 |
| 3,132,044 | 5/1964 | Pearsall | 264/60 |
| 3,579,390 | 5/1971 | Paine | 264/60 |
| 3,978,248 | 8/1976 | Usami | 427/376.2 X |
| 4,073,999 | 2/1978 | Bryan et al. | 427/376.3 X |
| 4,089,921 | 5/1978 | Dobo | 264/63 |
| 4,317,850 | 3/1982 | Verburgh et al. | 427/376.3 X |
| 4,713,300 | 12/1987 | Sowman et al. | 427/102 X |

FOREIGN PATENT DOCUMENTS

| | | |
|---|---|---|
| 3224555 | 1/1984 | Fed. Rep. of Germany . |
| 3224556 | 1/1984 | Fed. Rep. of Germany . |

*Primary Examiner*—Jan H. Silbaugh
*Assistant Examiner*—Karen D. Kutach
*Attorney, Agent, or Firm*—W. G. Fasse; D. H. Kane, Jr.

[57] ABSTRACT

The bonding of a porous metal layer to at least one surface of a cermet is accomplished, without a supporting metal netting in the green cermet blank, by using a reducible metal oxide in the green cermet blank and a reducible metal oxide layer on the surface or surfaces of the green blank. In the following reducing sintering step the metal component in the green blank and the porous metal layer are formed simultaneously resulting in an intimate strong bond between the cermet blank and the porous metal layer. Both reducible metal oxides may be the same. The resulting product, such as an electrode-diaphragm-electrode structure is well suited for use in water electrolysis, chlorine alkaline electrolysis, and in fuel cells.

21 Claims, No Drawings

METHOD FOR BONDING A POROUS METAL LAYER TO A CERMET SURFACE

FIELD OF THE INVENTION

The invention a method for bonding a porous metal layer to a cermet surface to form a cell or bi-polar plate in which the cermet acts as a diaphragm and the porous metal layer acts as an electrode. The cell is suitable, for example, for water electrolysis, chlorine alkali electrolysis, or for fuel cells or the like.

DESCRIPTION OF THE PRIOR ART

German Patent Publication (DE-OS) No. 3,224,556 discloses forming a green cermet blank one or both surfaces of which are covered with a layer of a reducible metal oxide. The so-formed blank with its reducible metal oxide layers or coatings is subjected to a reducing sintering, whereby the metal oxide is transformed into the porous metal layer or layers. In this known method the green cermet blank is produced of a mixture of the ceramic component and a metal powder, such as nickel powder. It has, however, been found, that the bonding between the metal surface and the cermet body that results from this conventional method is unsatisfactory because the bonding has an insufficient mechanical stability.

It is known from German Patent Publication (DE-OS) No. 3,224,556 to improve the mechanical stability of the cermet intermediate body or intermediate layer between two metal layers by introducing into the cermet layer a metal netting. The locating of such a metal layer in the cermet body is rather involved and hence expensive. Such expense is not even justified because the stabilization achieved by means of the metal netting and any remaining flexibility of the finished product still leave much to be desired. Another disadvantage of the metal netting in the cermet body between the two electrode forming metal surface coatings, is seen in the fact that the netting may cause a metallic, conducting path and hence a short-circuit between the two electrodes, thereby making the respective element useless.

OBJECTS OF THE INVENTION

In view of the foregoing it is the aim of the invention to achieve the following objects singly or in combination:

to provide an improved bonding between a cermet body or layer and a porous metal layer forming an electrode on the cermet body to provide a cell or bi-polar plate suitable, e.g., for water electrolysis, chlorine alkali electrolysis, fuel cells, or the like;

to avoid the use of a metal netting inside the cermet body or layer altogether to thereby also obviate the difficulties and expenses encountered with such metal nettings;

to provide a cermet metal layer bonding which has a high mechanical stability while remaining sufficiently flexible for the above mentioned diaphragm purposes;

to avoid the danger of an electrical short-circuit inside such diaphragms and/or cells.

SUMMARY OF THE INVENTION

According to the invention it has been found that the above mentioned metal netting can be completely avoided if the layer or layers of reducible metal oxide are applied to a green cermet blank which does not have the above mentioned netting, but which instead is formed of a mixture in which the ceramic component and a reducible metal oxide are combined so that the metal component of the cermet may be formed from said reducible metal oxide during the reducing sintering. In other words, according to the invention a first cable metal oxide is used for forming the cermet and a second reducible metal oxide is used for forming the electrode layer. It is believed that the surprisingly effective bonding between the cermet and the metal electrode is due to the fact that during the reducing sintering of the metal oxide, metal is formed in the "status nascendi". Such virgin metal, so to speak, diffuses toward the grain boundaries, thereby entering into an intimate, strong bonding between the particles of the sintered body. As a result, an extraordinarily good bonding between the cermet surface and the electrode layers is achieved. Thus, according to the invention cermets without the conventional metal netting can be used. Both reducible metal oxides may be of the same kind.

DETAILED DESCRIPTION OF PREFERRED EXAMPLE EMBODIMENTS AND OF THE BEST MODE OF THE INVENTION

Preferably, the proportion of the reducible metal oxides in the green cermet blank are so selected that the metal resulting during the sintering corresponds to about 5% to about 40% of the weight of the cermet.

All reducible metal oxides for the metal components of the cermets as well as for the porous metal layers are preferably selected from metal oxides of the Sub-Group I, Sub-Group II, or Sub-Group VIII of the periodic system, especially iron, cobalt, and nickel. These metal oxides or mixtures of these metal oxides result in defined alloys after the reductive or reducing sintering. These alloys are already selected in accordance with the principle of the catalytically active matrix. Thus, the anode is preferably produced of a mixture of nickel oxide or cobalt oxide with a cobalt oxide proportion within the range of about 20 to about 90% by weight, preferably 50 to 80% by weight. Especially preferable is an alloy comprising 33.34 atom-% nickel and 66.66 atom-% cobalt, whereby the respective alloy corresponds in its composition to spinel $NiCo_2O_4$.

The ceramic component of the cermet body comprises, preferably, calcined milled component of earth alkali oxides, alkali oxides, or rare earth metal oxides,, as well as amphoteric oxides of the metals of Sub-groups III, IV, V and VI of the periodic system. Especially preferred are the oxides of the earth's alkali metals and those of the fourth and fifth sub-group of the periodic table, for example, mixed oxides having a defined structure, especially earth alkali titanate such as $CaTiO_3$, $BaTiO_3$, and $SrTiO_3$. However, $BaZrO_3$, as well as hafnium oxide, niobium oxide, or tantalum oxide are suitable for the present purposes. It has been found that especially good bondings have been obtained with calcium titanate forming the ceramic component of the cermet. These good results are believed to be due to the low sintering temperature of calcium titanate. Generally, earth alkali titanates are preferred, due to their thermodynamic stability relative to the cathodic reducing and relative to the anodic oxidation as well as due to their small solubility in a caustic solution. Thus, titanates are substantially non-soluble in a caustic solution so that no problems occur with any removal of heavy metal wastes, which is an advantage.

The layer of a reducible metal oxide to be applied to the cermet blank, preferably, contains also a non-reducible metal oxide, whereby the proportion of the latter is so selected that it amounts to about 30% by weight, at the most, of the porous metal layer, and 0% by weight as the lower limit.

The advantage of the non-reducible metal oxide in the electrode layer is seen in that it provides a large inner surface area and thus a large porosity by preventing the recrystallization of the metal and also preventing the caking of the metal. This is necessary in order to assure a low excess voltage in the electrolysis. Aluminum oxide is preferably used as the nonreducible metal oxide because it is relatively inexpensive and because it goes partly into solution into the alkaline electrolysis, whereby the porosity of the electrode layer is increased without disturbing the electrolyte. The gamma form of the aluminum oxide is preferred, due to its large solubility. The bonding of this type is particularly suitable for the alkaline electrolyte systems. This bonding is not particularly suitable for acidic electrolytes, since these are strongly corrosive.

It is advantageous that the layer of reducible metal oxide applied to the green cermet blank comprises a metal powder. The proportion of the metal powder is so selected that it amounts to maximally 60% by weight, preferably 40% by weight of the combined weight of the reducible metal oxide and metal powder. The lower limit of metal powder is about 0% by weight.

The addition of the metal powder to the reducible metal oxide has the advantage that the shrinking of the metal oxide layer during the reducing sintering is substantially reduced. Without such addition of a metal powder, the shrinking may amount to up to 20% of the surface area. It has been found to be advantageous to keep the size of the particles of the metal powder small to avoid sedimentation. Particles up to 50 $\mu$m, for example, are effective and also suitable for the application by screen printing techniques.

In addition to the above mentioned metal powder, it is possible to add to the reducible metal oxide forming the layer or coating on the green cermet blank, one or several activating metals. According to the invention the activating metal may be efficiently mixed directly into the printing or other paste that is used for making the reducible metal oxide coating. This is contrary to the prior art in which the activation of the electrode is accomplished by a separate coating treatment. By mixing the activating metal directly into the mass which is used for forming the electrode layer or coating, a separate activating electrode treatment is avoided. If the activating metal is introduced into the mass as an oxide or a salt, the activating metal is then reduced to its metallic form during the reducing sintering of the compound structure. Any transition metal is suitable for use as an activator metal if it has a synergistic effect that can be utilized for the electrocatalysis of the hydrogen formation or that can be utilized for the hydrogen oxidation in the alkaline fuel cell. Thus, the oxides of the metals from the sixth and seventh sub-group of the periodic system or table may be used as well as the oxides of the precious metal of the ninth, tenth, and eleventh sub-group of the periodic table. Similarly, additives in the form of metal oxides, metal salts, or metals which act as catalyzers in the electrochemical oxygen formation or reduction may be introduced into the reducible metal oxide layer forming the electrode. For example, metals of the iron group, such as cobalt or precious metals, such as gold or silver, or platinum metals or molybdenum or ruthenium, or mixtures of these mentioned elements may be used. Lanthanum and strontium are also suitable for the purposes. Further, salts, especially salts of organic acids, such as acetates, are suitable for the activating purposes.

The additives should not exceed 50% by weight of the porous metal layer. In other words, the reducible metal oxide should provide at least 50% by weight of the porous metal layer.

The bonding of the porous metal layer to the surface or surfaces of the green cermet blank may be accomplished according to the invention as follows. The oxides forming the ceramic component of the cermet and the reducible metal oxides forming the metal component of the cermet are subjected together to a milling operation to form a powder mixture. Thereafter, the powder mixture is combined with additives, such as organic, volatile binders and/or water to form a paste, emulsion, or some other plastic mass. The so-formed mass is then spread out, for example, with a blade or wiper to form a film constituting the green cermet blank. The so-formed blank is then coated on one surface or on both surfaces by so-called film pulling, calendering, or screen printing to apply a layer or coating of the reducible metal oxide. Thereafter, the so-formed compound blank is subjected to a reducing sintering, preferably in an $H_2$ or CO containing inert gas atmosphere. For example, the reaction sintering atmosphere may comprise at least 80% by volume of $N_2$, the remainder being $H_2$ or CO. Thus, the $H_2$ or CO may range from 1 to 20% by volume. The sintering reaction temperature of the cermet blank is selected to be slightly below the melting temperature of the metals which are formed out of the reducible metal oxides. Thus, it is advantageous to perform the reduction after the ceramic sintering of the cermet layer, at lower temperatures typically within the range of 850° C. to 950° C.

Typical layer thicknesses for the cermet layer of the compound structure according to the invention are within the range of about 0.2 to 5.0 mm, preferably within the range of 0.3 to 2.0 mm. The thickness of the metal layer or layers forming the electrodes is within the range of 0.1 to 5.0 mm, preferably 0.2 to 2.0 mm.

In order to improve the supply of reaction gas and the removal of gases produced during the sintering on the porous metal electrodes, the electrode layer is preferably structured so as to have different characteristics from the inside out, that is, from the cermet surface outwardly to the surface of the electrode layer in such a way that the size of the pores and/or of the grains increases in an outward direction.

For this purpose, the layer or coating of reducible metal oxide is structured of several partial layers, each of which may be applied, for example, by a separate screen printing step. For example, in order to obtain differently structured individual partial layers formed by screen printing, one starts with an inner partial layer which is printed directly onto the diaphragm surface. This first printing step is followed by further printing steps, whereby in each step a paste is used having larger metal oxide particles. Instead of using metal oxide particle sizes which increase in an outward direction, or in addition to using such sizes, it is possible to include in the individual screen printed layers suitable filler materials. For example, carbon may be used as a filler material which evaporates during the reduction type of sintering. The concentration of the evaporating filler materials should decrease from the outside inwardly so that the innermost partial layer has the least proportion of filler materials. In this manner it is possible to displace growing gas bubbles from the inner partial layer outwardly, whereby the gas bubbles tear off on the outer surface as soon as they reach a critical size. The gas bubbles either rise upwardly in the sintering layer, or they are scavenged out of the sintering layer where an enforced convection flow is maintained. In case of a fuel cell the gas transport into the electrode is quite efficient due to the hydrophobically made large pores in the outer electrode layer or coating.

The application of the layer of reducible metal oxide in a plurality of partial layers has further advantages in addition to those mentioned above. Thus, it is possible to introduce the activating metals, preferably directly into the innermost partial layer. This location for the activator metals is advantageous because the innermost partial layer is electrolytically most active due to its small spacing to the opposite electrode.

The outermost partial layer can be provided with recesses or holes directly by the screen printing process. These holes may have a diameter of, for example about 0.5 to about 5 mm. Thus, a type of apertured plate or screen is formed on the electrode surface which provides an especially advantageous outer electrode layer for the current distribution and gas removal.

The compound material produced according to the invention with a cermet metal bonding, constitutes a very flexible, highly corrosion resistant, porous material which is especially suitable for making electrolysis cells of the so-called "zero-gap" type having diaphragms bonded to the electrodes useful for the water electrolysis, the chlorine alkaline electrolysis, and for fuel cell techniques. The cermet layer is hydrophilic to fix the electrolyte so that mixing of the gases in both electrodes is avoided. The bonding produced according to the invention is especially suitable for the production of an extremely compact, bi-polar cell stack arranged in the manner of a filter press stack. The material according to the invention is, for example, used as a diaphragm which has an electrode on each of its surfaces and which separates a container holding alkaline water into an anode chamber neighboring the anode electrode, and into a cathode chamber neighboring the cathode electrode for subjecting the alkaline water to an electrolysis. Hydrogen gas is formed on the surface of the cathode electrode in the cathode chamber. Oxygen gas is formed on the surface of the anode electrode in the anode chamber.

On the other hand, when the present material is used in a fuel cell, hydrogen gas is introduced to one of the electrodes, while oxygen gas is introduced to the other electrode, both of which are formed of a porous metal layer as taught herein. In this case the electrolyte is fixed inside the cermet-diaphragm layer, which is connected to an electrolyte reservoir system inside the cell frame.

EXAMPLE 1

A mixture of 50% by weight of NiO powder and 50% by weight of $CaTiO_3$ powder having an average grain size of 5 $\mu$m is calcined for four hours at a temperature of 250° C. The calcined material is fractured and milled, whereupon the fractures are screened out into three groups A, B, and C. Group A comprises the grain sizes from 0.5 to 5 $\mu$m. Group B comprises the grain sizes from 10 to 20 $\mu$m. Group C comprises the grain sizes from 20 to 50 $\mu$m. Thereafter, three test samples are formed. The first test sample A1 comprises 100% by weight of a powder of group A. The second test sample B1 comprises 60% by weight of powder of group A and 40% by weight of powder of group B. The third test sample C1 comprises 50% by weight of powder of group A 30% by weight of powder of group B and 20% by weight of powder of group C. Test sample A1 is formed into a paste by adding a 2% sugar solution. The so-formed paste is subjected to film pulling to form a layer of 200 $\mu$m thickness which constitutes the green cermet layer. Onto this layer, which later forms the diaphragm, a paste of so-called green nickle oxide (NiO) is applied as a coating having a thickness of 0.2 mm. The two layers are dried and the sugar binder in the green material is thermally decomposed, whereupon the two layer structure is subjected to a reaction sintering at a temperature of about 1100° C. for a duration of about 45 minutes in an atmosphere containing about 40% by weight of $H_2$ at about 60% by volume of $N_2$. The result is a cermet diaphragm having a high porosity of about 45% and covered with a porous electrode.

EXAMPLE 2

The sample powder B1 is mixed with 3% by weight of gum arabicum to form a paste which is then spread with a blade or wiper to form a film. Thereafter, a mixture of green NiO and black NiO in a weight ratio of 1:1 is screen printed onto each side of the initially formed film. Each coating on the initially formed film has a coating or layer thickness of about 0.2 mm while the cermet film or layer itself has a thickness of about 0.4 mm. The further treatment takes place as set forth above in Example 1. The result is a diaphragm well bonded with both of its surfaces to a respective porous electrode.

EXAMPLE 3

The powder of sample C1 is mixed with 3% by weight of an aqueous "Mowiol" solution manufactured by Farb Werke Hoechst AG, to form a paste which is also spread as a green cermet layer having a thickness of about 220 $\mu$m. Thereafter, one side of the so-formed layer or film is printed with green $NiO_2$ mixed with 3% by weight of $MoO_3$ having a thickness of about 250 $\mu$m. After the printing step the material is subjected to a reaction sintering at a temperature of 1100° C. in an atmosphere of 50% by volume of $N_2$ and 50% by volume of $H_2$. The result is a diaphragm, one surface of which is bonded to a cathode, whereby the molybdenum acts as an activator of the cathode for the $H_2$-generation.

Although the invention has been described with reference to specific example embodiments, it will be appreciated, that it is intended to cover all modifications and equivalents within the scope of the appended claims.

What we claim is:

1. A method for bonding a porous metal layer to a cermet surface of a cermet blank to form a cell or bi-polar plate in which the cermet acts as an electrically non-conducting diaphragm and the porous metal layer acts as an electrode, comprising the following steps:
   (a) preparing a ceramic component and a metal component for the formation of said cermet blank, said ceramic component being selected as a calcined, milled component from the group consisting of alkaline earth metal oxides, alkaline metal oxides, rare earth metal oxides, amphoteric oxides of Sub-Groups III, IV, V, and VI of the periodic table and any mixture of the just listed group, said metal component being selected in the form of a first reducible metal oxide powder from the group consisting of Sub-Groups I, II and VIII of the period table, (b) mixing said ceramic component and said first reducible metal oxide powder to form a cermet mixture, wherein said first reducible metal oxide powder is so proportioned that a resulting metal proportion in said cermet blank corresponds to about 5% by weight to about 40% by weight of said cermet blank, (c) preparing from said cermet mixture a green cermet blank without any supporting metal netting in said green cermet blank, (d) applying a coating of a second reducible metal oxide including an activating metal to at least one surface of said green cermet blank, and (e) subjecting said green cermet blank and said coating to a reducing sintering for forming from said first reducible metal oxide powder said metal component of said cermet blank having improved bonding capabilities, and for forming simultaneously from said second metal oxide said porous metal layer effectively bonded to said cermet surface thereby providing said cermet blank with said metal layer bonded thereon, said bonded cermet having high mechanical stability and sufficient flexibility to act as said diaphragm and electrode of said bi-polar plate.

2. The method of claim 1, wherein said second reducible metal oxide is also an oxide of a metal selected from the group consisting of Sub-Groups I, II, and VIII of the periodic table.

3. The method of claim 1, further comprising selecting said first reducible metal oxide powder and said second reducible metal oxide from the group consisting of nickel oxide, cobalt oxide, and iron oxide.

4. The method of claim 3, wherein said first reducible metal oxide powder and said second reducible metal oxide comprise a mixture of nickel oxide and cobalt oxide, with said cobalt oxide corresponding to about 20% by weight to about 90% by weight of said mixture of said metal oxides, the remainder being nickel oxide.

5. The method of claim 4, wherein said cobalt oxide is within a preferred range of 50 to 80% by weight of said mixture of said metal oxides.

6. The method of claim 1, further comprising adding to said second reducible metal oxide a third non-reducible metal oxide in such a proportion that said non-reducible metal oxide corresponds maximally to 30% by weight of the porous metal layer and minimally to 0% by weight of the porous metal layer.

7. The method of claim 6, wherein said non-reducible metal oxide is a metal oxide that is soluble in an alkaline solution.

8. The method of claim 6, wherein said non-reducible metal oxide is aluminum oxide.

9. The method of claim 1, wherein said coating of said second reducible metal oxide further comprises a metal powder, whereby the proportion of said metal powder is selected to constitute maximally 60% by weight of said second reducible metal oxide and said metal powder, and minimally 0% by weight of said second reducible metal oxide and said metal powder.

10. The method of claim 9, wherein the metal of said metal powder is selected from the group consisting of the metals from Sub-Groups I, II and VII of the periodic table.

11. The method of claim 9, wherein the metal of said metal powder is selected from the group consisting of nickle.

12. The method of claim 1, wherein said activating metal of said coating is providing in metallic form.

13. The method of claim 1, wherein said activating metal of said coating is provided as an activating third reducible metal oxide which, during said reducing sintering, changes into its metallic form.

14. The method of claim 1, wherein said activating metal of said coating is provided in the form of a metal salt which changes into its metallic form during said reducing sintering.

15. The method of claim 1, wherein said coating of said second reducible metal oxide is applied by a screen printing process.

16. The method of claim 1, wherein said step of applying a coating of said second reducible metal oxide comprises applying a plurality of partial layers to said at least one surface of said green cermet blank, said sintering reducing said plurality of partial layers substantially simultaneously.

17. The method of claim 16, wherein said plurality of partial layers is applied by a screen printing process.

18. The method of claim 16, wherein said plurality of partial layers of said second reducible metal oxide are formed of a metal oxide powder having different metal oxide powder particle sizes, in such a way that an innermost partial layer closest to said cermet surface has metal oxide powder particles of the smallest size while an outermost partial layer has metal oxide powder particles of the largest size, so that the particle size of said metal oxide powder of said coating of said second reducible metal oxide increases from said innermost partial layer to said outermost partial layer.

19. The method of claim 18, further comprising mixing said metal oxide powder particles with an additive that evaporates during said reducing sintering, said additive having its highest concentration in said outermost partial layer and its lowest concentration in said innermost partial layer, so that said concentration of said additive in said partial layers decreases from said outermost partial layer to said innermost partial layer.

20. The method of claim 18, further comprising adding an activator metal to said second reducible metal oxide in such a way that said activator metal is part of said inner partial layer or layers.

21. The method of claim 18, wherein said outermost layer is formed by a screen printing process.

* * * * *

UNITED STATES PATENT AND TRADEMARK OFFICE
CERTIFICATE OF CORRECTION

PATENT NO. : 4,898,699

DATED : February 6, 1990

INVENTOR(S) : Hans Hofmann, Hartmut Wendt

It is certified that error appears in the above-identified patent and that said Letters Patent is hereby corrected as shown below:

Claim 1, line 16, replace "period" by --periodic--;
       line 28, after "face" insert --,--.

Claim 6, line 5, replace "the" by --said--;
       line 6, replace "the" by --said--.

Claim 11, line 3, replace "nickle" by --nickel powder, cobalt powder, and iron powder--.

Claim 12, line 2, replace "providing" by --provided--.

Signed and Sealed this

First Day of January, 1991

Attest:

HARRY F. MANBECK, JR.

*Attesting Officer*  *Commissioner of Patents and Trademarks*